D. E. COMPERE.
MECHANICAL DEVICE FOR CONCENTRATING VISION.
APPLICATION FILED FEB. 24, 1916.

1,313,262.  Patented Aug. 19, 1919.

WITNESS
C. W. Ellis

INVENTOR
D. E. Compere
BY
John M. Spellman
ATTORNEY

UNITED STATES PATENT OFFICE.

DOLPHUS E. COMPERE, OF DALLAS, TEXAS.

MECHANICAL DEVICE FOR CONCENTRATING VISION.

1,313,262.          Specification of Letters Patent.          Patented Aug. 19, 1919.

Application filed February 24, 1916. Serial No. 80,300.

*To all whom it may concern:*

Be it known that I, DOLPHUS E. COMPERE, a citizen of the United States, residing at Dallas, in the county of Dallas and State of Texas, have invented certain new and useful Improvements in Mechanical Devices for Concentrating Vision, of which the following is a specification.

My invention has relation to a mechanical device for concentrating vision and in such connection it relates more particularly to a device in the nature of spectacles or goggles having instead of each of the lenses a variable shutter or diaphragm to control the extent of opening through which the object is to be viewed.

It is well known in optics that the eye is capable of two fields of vision; namely, central or direct, and secondly, peripheral or indirect vision. Thus when we view an object and do not by muscular and nerve strain concentrate our vision upon that object, the eye accommodates and registers not only the object looked at but surrounding objects along radii projecting from the center of vision.

To accommodate the eye to concentration and thus eliminate peripheral or indirect vision requires grave strain upon the muscles of the eye and it is the object of my present invention to provide a mechanical concentration which will relieve muscular spasm of the optic muscles and nerves in the act of accommodating the eye to direct vision only.

In the carrying out of my invention there are provided a frame for attachment to the eyes of the user and having instead of the two lenses usually found in spectacles or eyeglasses two iris-diaphragm shutters combined with means for operating these shutters to control the extent of the central opening or aperture of the shutters. In the preferred form of my invention the shutters are carried at the exterior end of goggles, the interior end of the goggles being shaped to fit closely around the eye socket to exclude light. These goggles may be formed of metal, hard rubber, tortoise shell or the like and may be either opaque or lined with light excluding materials or paints.

The nature and scope of my invention will be more fully understood from the following description taken in connection with the accompanying drawings, forming part hereof, in which—

Figure 1:
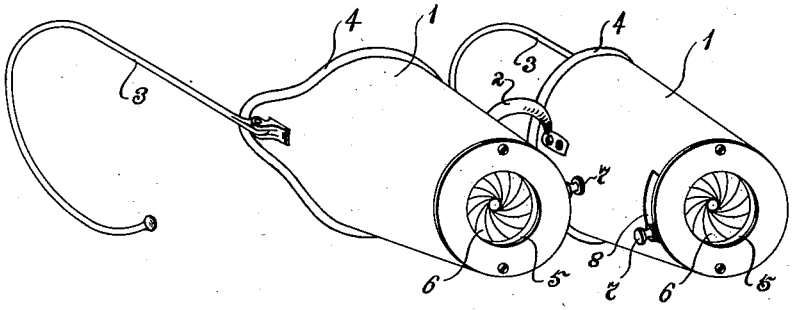
Figure 1 is a perspective view of a device embodying the main features of my invention.
Figure 2:
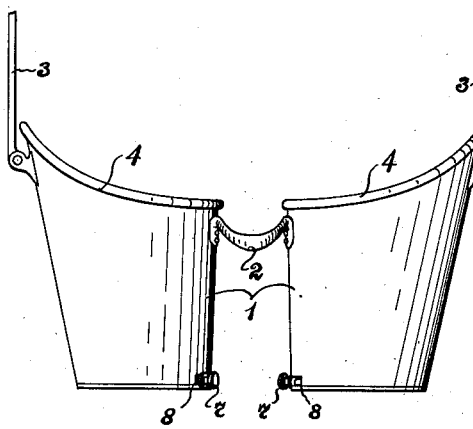
Fig. 2, is a plan view of the same.
Figure 4:
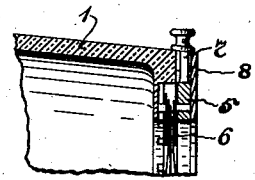
Fig. 4, is a cross sectional view of a portion of the end of the device.
Figure 3:
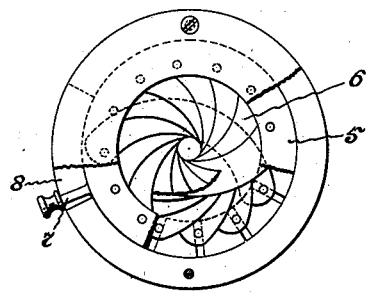
Fig. 3, is an end elevational view partly broken away of one of the diaphragm shutters of the device.

Referring to the drawings, the invention is shown as adapted to a pair of goggles in which 1—1 represents the tubular portions of the goggles and 2 the nose or bridge piece connecting the same. Spectacle bows 3 connected at one end to the tubes and formed to inclose a portion of the ears serve to hold the goggles to the eyes.

Each tube 1 has its inner end 4 shaped to closely fit the eye socket and to exclude light from the eye. The outer end of each tubular member 1 is fitted to an iris diaphragm shutter 5, the construction of which is well known in the art with the exception that the sectors 6 of the shutter are arranged so that they will not completely close together but will leave a central aperture of more or less area. The sectors 6 of each shutter 5 are moved by a short pin or stud 7 the head of which projects through a slot 8 cut in the rim of the shutter 6.

The tubes 1 may be made of hard rubber, metal such as aluminium or any other material treated to exclude light or be rendered opaque. If desired the interior of the tubes may be painted with a red, green, or blue coloring matter—green being especially desirable as restful to the eye.

In the use of my device the wearer adjusts the openings in the shutters to cover the field or object to be inspected and no more. The eyes focus or accommodate themselves to these openings without undue muscular contraction and the exclusion of peripheral or indirect objects of the vision by the tubes of the goggles from the eyes, has the effect of increasing the apparent illumination of the object and serves to more sharply define the outlines of the object.

In moving picture shows the new device will be found most necessary in relieving the eyes from fatigue caused by the effort of concentration upon the illuminated screen, of the eyes which are sensitive to the peripheral and indirect rays of light. My device acts not only as a mechanical concentrator but also serves to cut off or exclude exterior, peripheral vision.

Having thus described the nature and objects of my invention, what I claim as new and desire to secure by Letters Patent is,—

1. In a device of the character described, a frame having two tubular eye shields to fit closely about the eyes and means for securing the frame adjacent to the eyes, in combination with a pair of iris diaphragm shutters secured in the outer ends of the tubular eye shields and means for projecting from the frame and arranged for operating said shutters.

2. In a device of the character described, two tubular eye shields and a bridge or nose piece connecting the tubular eye shields to constitute a pair of goggles, in combination with a pair of iris diaphragm shutters each secured in the outer end of an eye shield and means for operating said shutters said means comprising essentially a pin projecting from each eye shield and operatively connected with the shutters.

3. As a new article of manufacture, a pair of tubular eye shields to closely fit the eyes, having within their outer ends a pair of iris diaphragm shutters and a means for operating each shutter comprising essentially a pin projecting from either member of the tubular shields and operatively connected with the shutter.

In testimony whereof I have signed my name to this specification.

DOLPHUS E. COMPERE.